(No Model.) 8 Sheets—Sheet 1.
F. H. ROGERS.
HARVESTING MACHINE.
No. 509,492. Patented Nov. 28, 1893.
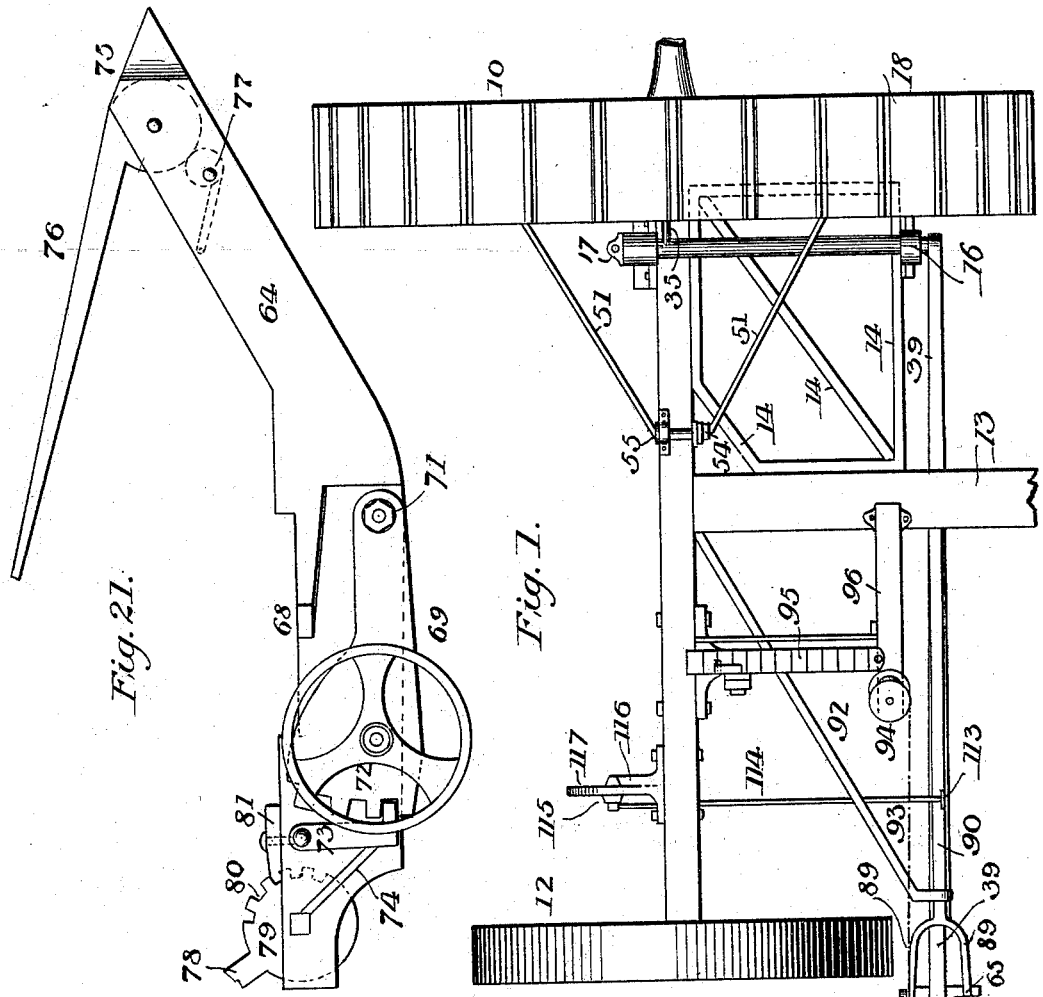
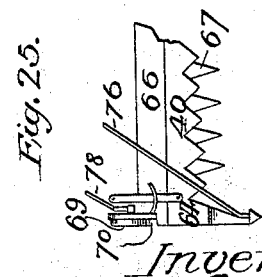
Witnesses:
Chas. E. Dawson
James H. Freeman Jr.
Inventor:
F. H. Rogers
By A. J. O'Brien
Atty
THE NATIONAL LITHOGRAPHING COMPANY,
WASHINGTON, D. C.

(No Model.) 8 Sheets—Sheet 2.
F. H. ROGERS.
HARVESTING MACHINE.
No. 509,492. Patented Nov. 28, 1893.
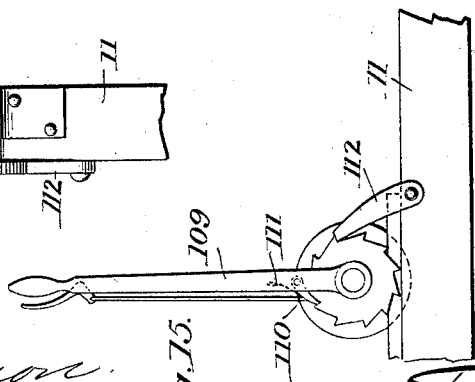
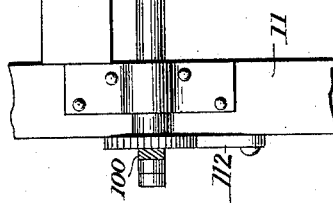
Witnesses:
Chas. E. Dawson
James H. Freeman Jr.
Inventor:
F. H. Rogers
By A. J. O'Brien
Atty

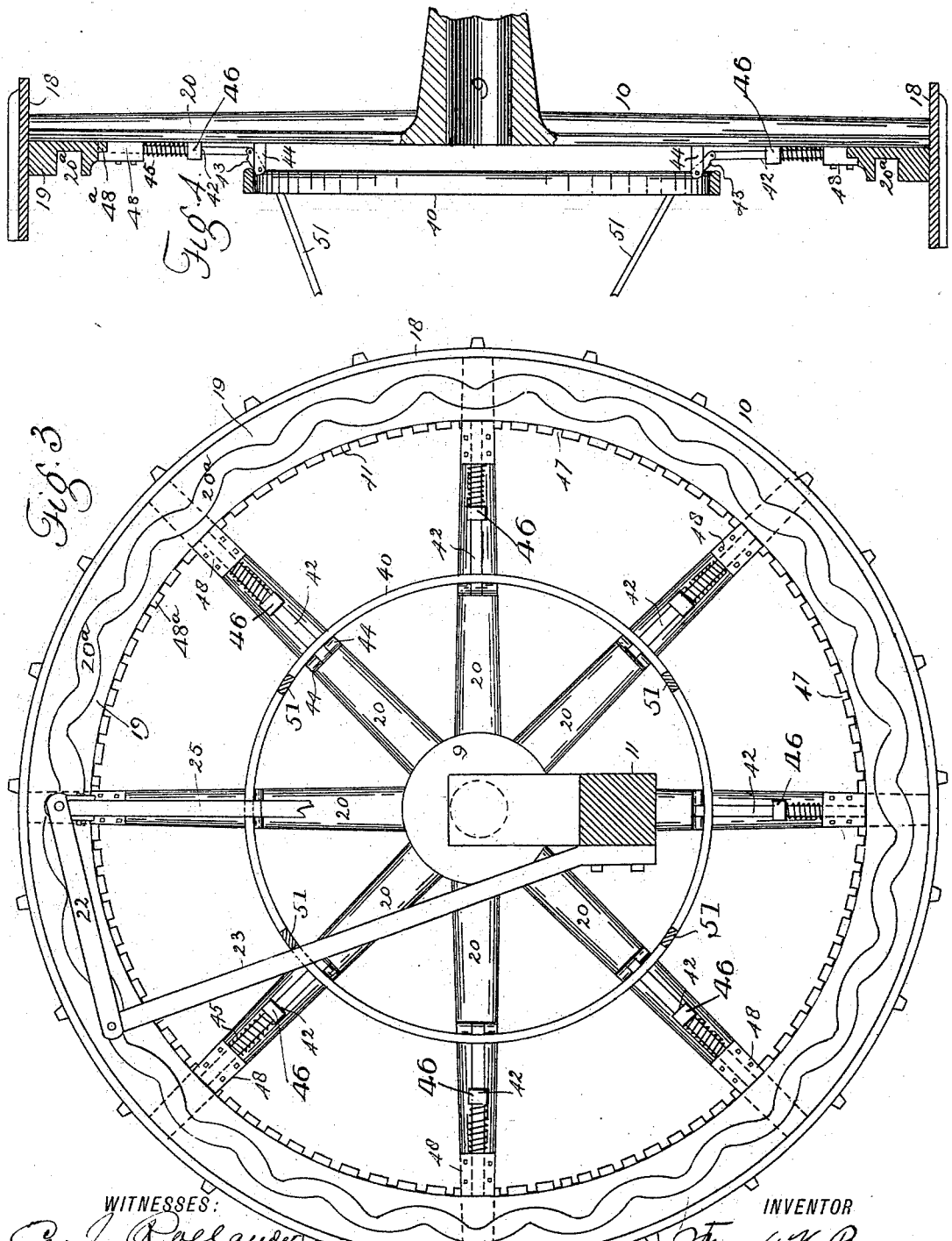

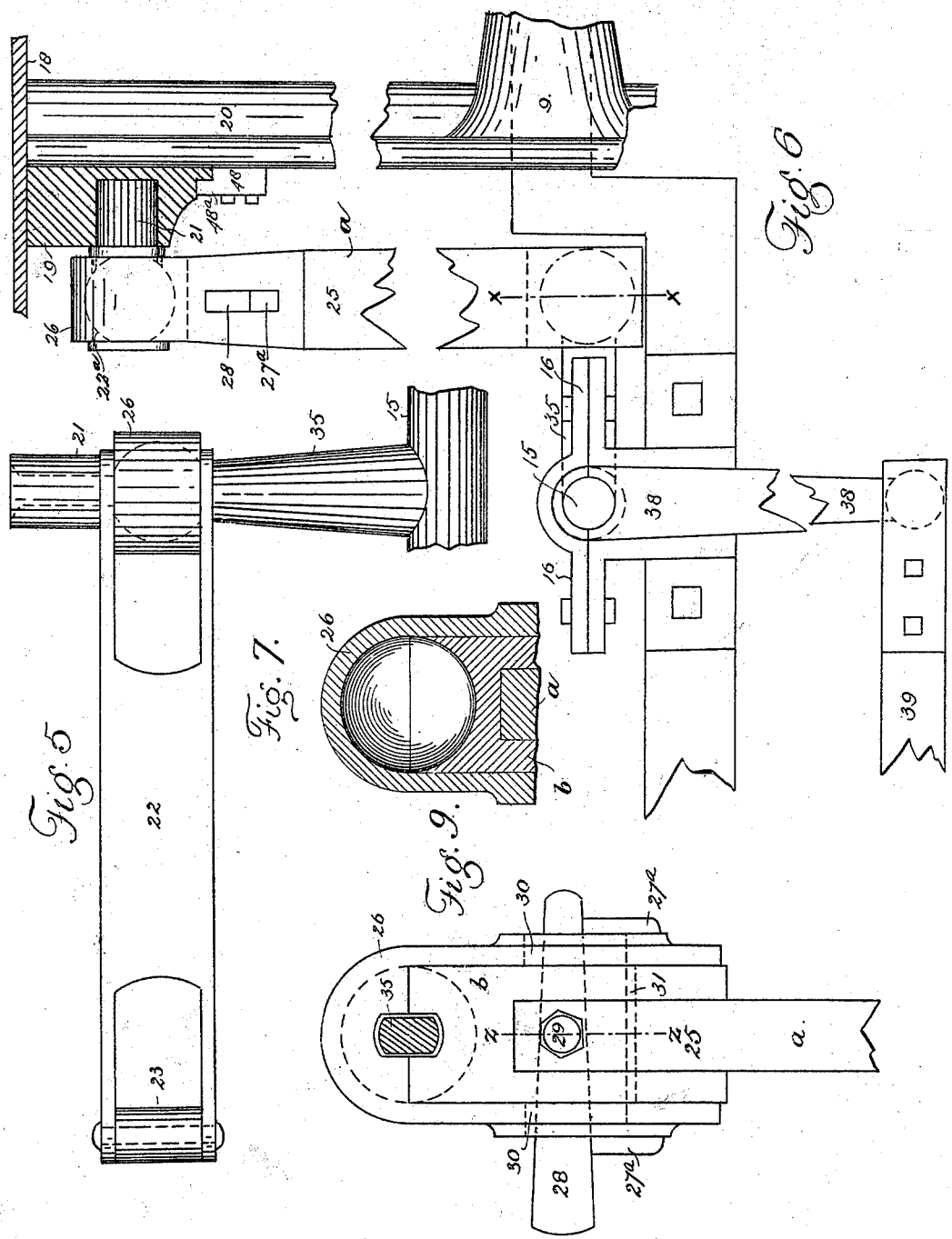

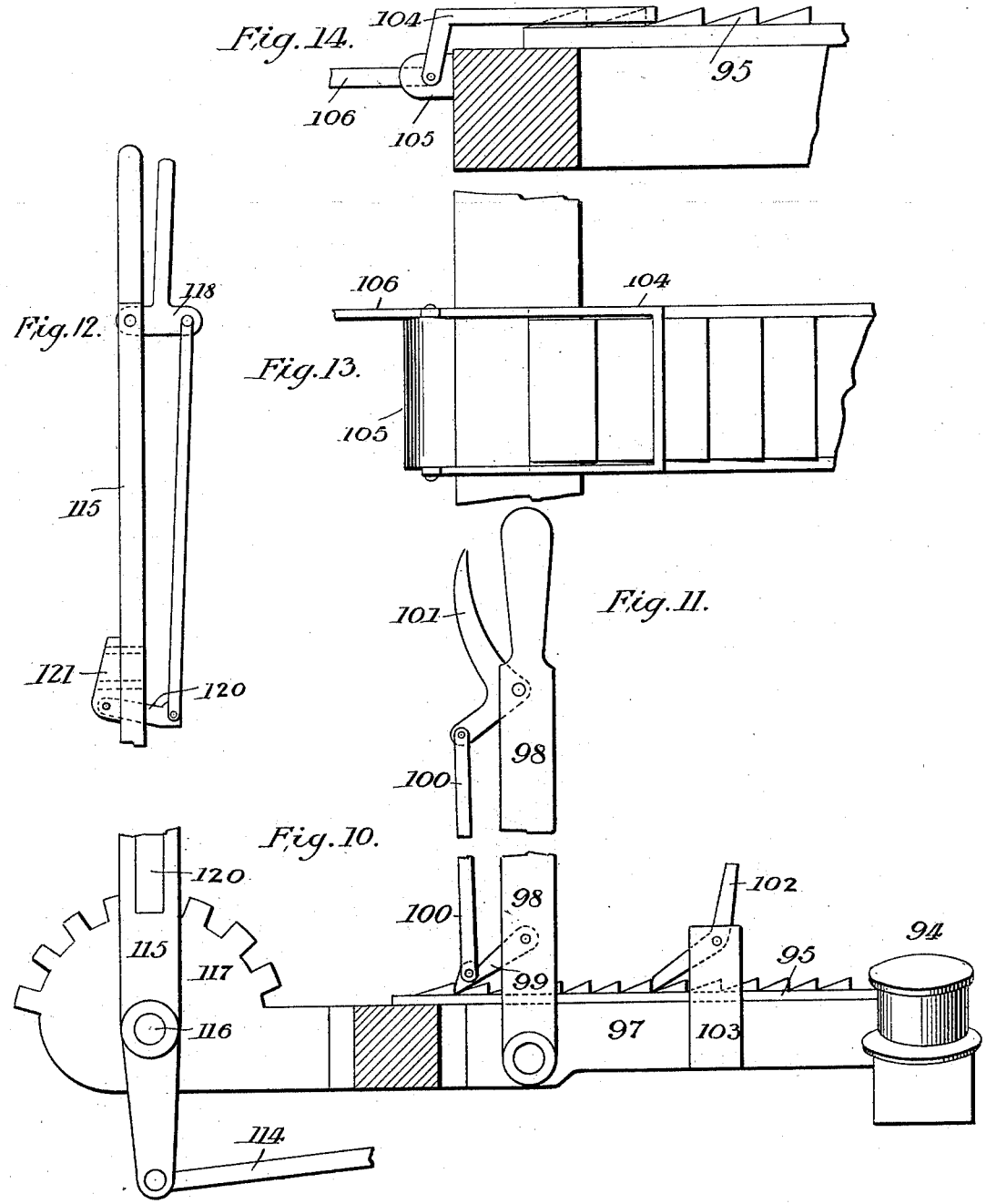

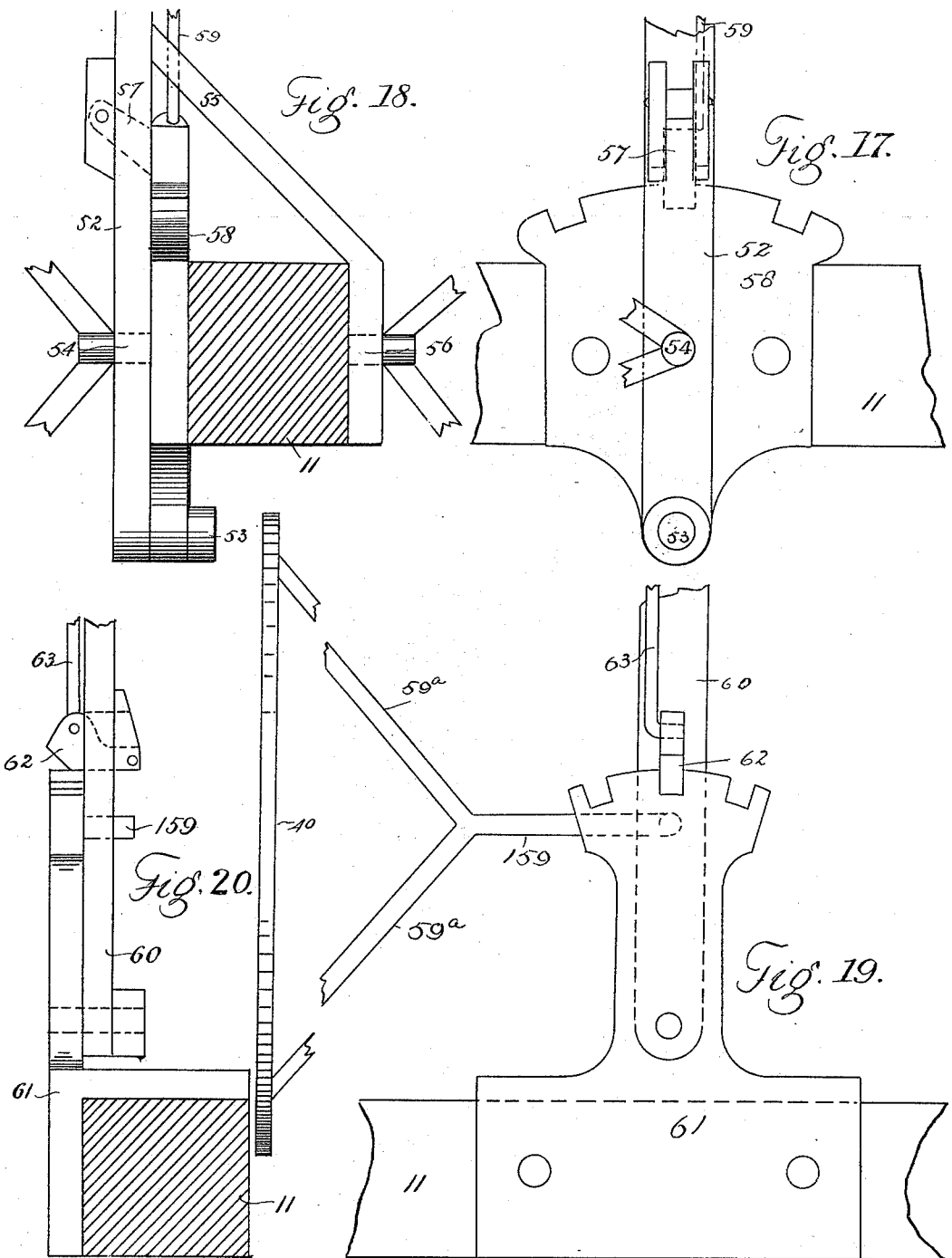

(No Model.) 8 Sheets—Sheet 7.
F. H. ROGERS.
HARVESTING MACHINE.
No. 509,492. Patented Nov. 28, 1893.
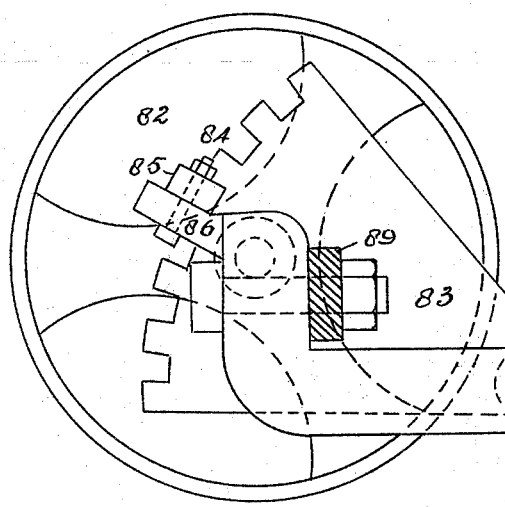
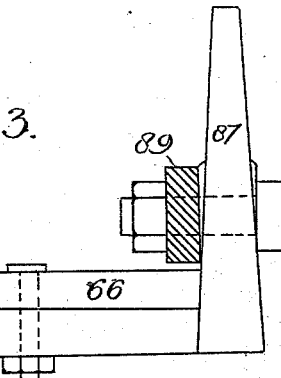
Fig. 23.
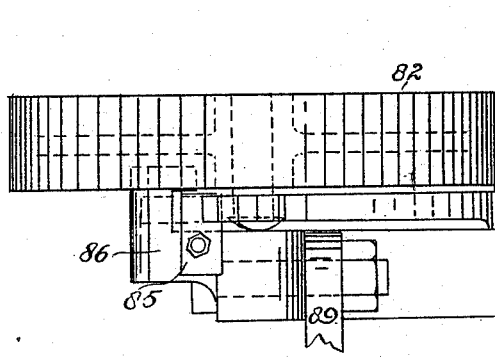
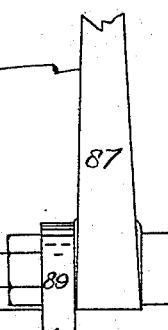
Fig. 24.
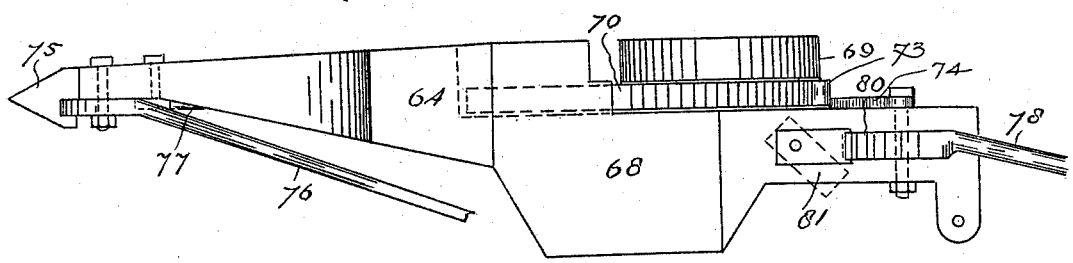
Fig. 22.

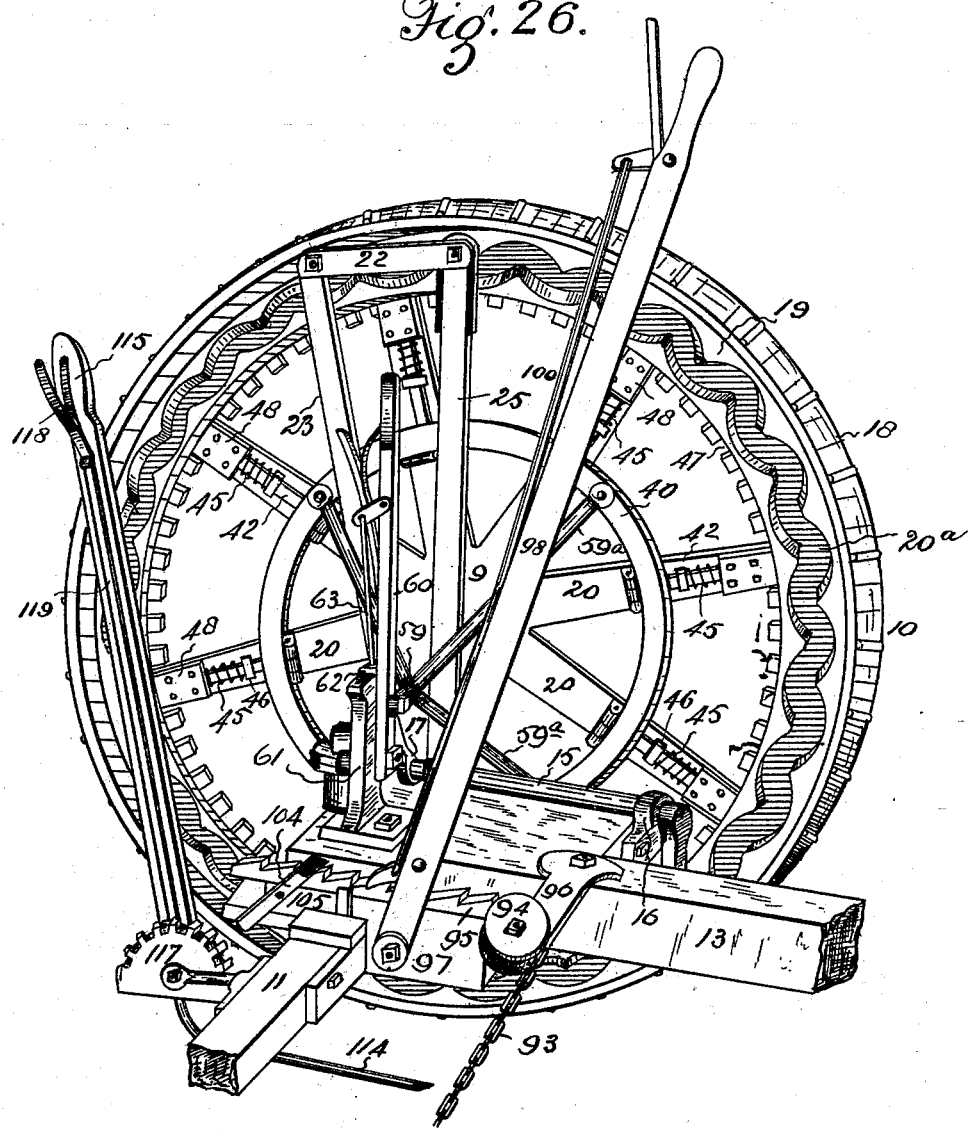

UNITED STATES PATENT OFFICE.

FRANK H. ROGERS, OF GOLDEN, COLORADO.

HARVESTING-MACHINE.

SPECIFICATION forming part of Letters Patent No. 509,492, dated November 28, 1893.

Application filed April 1, 1891. Serial No. 387,294. (No model.)

*To all whom it may concern:*

Be it known that I, FRANK H. ROGERS, a citizen of the United States of America, residing at Golden, in the county of Jefferson and State of Colorado, have invented certain new and useful Improvements in Harvesting-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to harvesting machines, for either reaping or mowing, in which the cutting is done by the action of reciprocating knives or sickles having a serrated edge or face and working over or in between grooved fingers; and more particularly to that class or type thereof in which the power is communicated from the main driving wheel by means of a cam-groove upon the inner face thereof, a cam roller working therein and mechanism connected therewith for transmitting the power to the knives or sickles and causing them to reciprocate, and its objects are to produce a powerful and compactly built machine of such class or type; one in which great speed may be given to the reciprocating knives or sickles, and the greatest possible percentage of power applied to the machine, transmitted to sickle from the main drive wheel or prime motor; in which any desired inclination may readily and reliably be given to the knives or sickles and the finger guards, both as regards inclination or angle to the body of the machine and as regards inclination or angle to the surface the machine may be traveling over; in which the friction of the moving parts shall be reduced to a minimum in order that power may be economized, or as fully as possible utilized in actual work; in which all cog, belt and other gearing liable to break or become disarranged shall be dispensed with, so that durability and minimum need of repairs shall be secured; in which the draft may be so equalized that the machine will normally travel in a straight line, avoiding the danger of side draft; in which all the devices used for regulating, arranging or controlling the action of the motive power or the position of the knives or sickles shall be in reach of the seat of the driver or operator, that he, without dismounting, may throw the knives or sickles out of operation, lift them up fold them up toward the frame of the machine or vary their angle to the surface being traveled over; in which danger of clogging by the material operated on shall be so reduced that practically there shall be no danger of such clogging; a machine easily operated, reliable in operation, utilizing to the fullest extent the power applied thereto, of speedy and rapid working capability, economical in cost of construction and durable; to which ends the invention consists of the features and combinations more particularly hereinafter described and claimed.

In the accompanying drawings a harvesting machine and various of its details, embodying the principles of my invention, are illustrated.

In the drawings, Figure 1 is a top or plan view of such harvester. Fig. 2 is a front view or elevation thereof; Fig. 3, a front view or elevation of the inner face of the main driving wheel; Fig. 4, a cross section of such wheel taken through the center of the hub with associated parts in elevation. Fig. 5 is a top view on an enlarged scale of the cam-roller arm and connecting parts. Fig. 6 is a front view of the mechanism shown in Fig. 5 together with the pitman and the laterally reciprocating or rocking arm connecting it with the rock shaft. A fragment of the main driving wheel is also shown in this view, the cam-roller being in operative position within its groove. Fig. 7 is a sectional view of the connection between the pitman and the rock shaft, taken on the line $x-x$, Fig. 6. Fig. 8 is a section taken on the line $z-z$, Fig. 9. Fig. 9 is a side view of the lower portion of the arm shown in Figs. 6 and 7. Fig. 10 is an enlarged side view in detail of mechanism for adjusting the finger bar. Fig. 11 shows the upper portion of one of the levers partially broken away in Fig. 10, while Fig. 12 is a similar view of the other lever partially illustrated in Fig. 10, the scale in Fig. 12, however, being much smaller than shown in Fig. 10. Fig. 13 is a top view on an enlarged scale of a fragment of the rack shown in Fig. 11, together with a modified form of locking pawl. Fig. 14 is a side view of the same. Fig. 15 is a side elevation in detail of another style of lifting mechanism. Fig. 16 is a top view of the same. Fig. 17 is a rear view on an enlarged scale of means for adjusting the movable ring in throwing the machine in and out of gear. Fig. 18 is a side view of the same, the axle being shown in cross section. Fig. 19 is a rear view of a modified form of mechanism, designed to accomplish the same purpose as that shown in Figs. 17 and 18. Fig. 20 is a side view of the same. Fig. 21 is a side view or elevation of the outer shoe. Fig. 22 is a top or plan view thereof. Fig. 23 is a side view or elevation of the inner shoe; Fig. 24, a top or plan view of the same. Fig. 25 is a top view of the outer portion of the sickle and finger bar including the outer shoe. This view forms in reality a part of Fig. 1. Fig. 26 is a perspective view of the driving wheel and the operating parts connected therewith.

In these views wherein similar reference characters indicate corresponding parts of the mechanism let the numeral 10 designate the main driving wheel mounted upon the upwardly bent outer extremity of the axle 11, the inner extremity of the axle which is bent downward being supported by a smaller wheel 12, the bend in the axle bringing the journal of this wheel to such a position with reference to the surface over which the machine moves, that the body of the axle shall lie parallel to such surface. The rear extremity of the tongue 13 is secured to the axle which is farther connected with the tongue by the metal bracket 14 forming a base or support for the forward extremity of the rocking shaft 15, provided with a journal box 16, the rear extremity of said shaft being supported in a box 17 secured to the rear side of the axle.

The wheel 10 is provided with a comparatively wide tread or rim 18 rigidly connected with the hub 9 by the spokes 20 which join the rim in a circle located outside of its center while the inner and wider portion of this rim overhangs and engages the outer edge of the circumferential plate 19 provided with the cam groove $20^a$ which is shaped substantially as shown in Fig. 3. Groove $20^a$ consists of a zigzag way of sufficient depth to receive and guide the cam roller 21 which is suitably journaled to the outer forward extremity of the elevated bar 22, the opposite extremity of said last named bar being pivoted to the upper extremity of a stationary support or standard 23, the lower extremity of said standard being rigidly secured to the axle as shown in Fig. 3. The forward extremity of bar 22 is forked and connected with the upper extremity of a perpendicular arm 25 by a ball and socket joint, the ball portion $22^a$ of the joint being connected with arm 22 and between the arms of its fork. The bearing for the cam roller 21 passes through the ball of this joint. Depending arm 25 is connected at its lower extremity by means of a ball and socket joint with the outer end of a crank arm 35 rigidly secured at its opposite or inner end with the rock shaft 15. Depending arm 25 is of peculiar construction in order to provide for taking up lost motion between its extremities, provision being also made for reducing the cost of repair to a minimum. With these objects in view let $a$ designate the body of the arm and $b$, $b$ its upper and lower extremities. The parts $b$ of the arm are provided with sockets for the reception of the extremities of part $a$. The upper surface of upper part $b$ is concave and forms the lower half of a spherical socket for the reception of the ball extremity $22^a$ of the arm 22, the upper half of this socket being formed by a clasp 26 engaging the upper half of ball $22^a$ and extending downward a suitable distance on either side of part $b$.

Parts $a$, $b$ and 26 are connected by a key 27, the stem or body portion of which extends through a transverse opening formed through the parts and indicated in dotted lines in Fig. 9. This key is provided with a lip $27^a$ projecting downward from each extremity and overlapping clasp 26 below the opening, so that the key cannot be removed from the opening without first raising it upward therein so that the lips will not catch. The opening is made considerably larger than the key, leaving a space above for the insertion of a wedge 28. This wedge when properly adjusted is held in place by a set screw 29, and when the parts are new the wedge should engage the wall of the opening in parts $a$ and $b$ while there should be a space 30 in clasp 26 between the wedge and the top of the opening. On the other hand key 27 should engage the bottom of the opening in clasp 26, while a space 31 should be left between the key and the bottom of the opening in parts $a$ and $b$. It will thus be observed that when the joint becomes worn so there would be lost motion, the joint may be tightened by loosening the set screw and driving the wedge farther into the opening.

The ball joint connection between the lower extremity of arm 25 and crank arm 35 is formed in the same manner as that just described, and therefore the corresponding parts will be designated by the same reference characters. It will be observed that in this case the ball portion of the joint is formed on the crank arm.

Rigidly secured to the forward extremity of the rock shaft and in line with the movement of the sickle 50 is a depending rocking or oscillating arm 38, the lower extremity of which is suitably pivoted to the pitman rod 39 whence motion is communicated to the sickle 50, the inner extremity of said rod being connected therewith in the usual manner.

Referring now to Fig. 3 it will be observed that the circumferential plate 19 having the cam groove 20 is provided with a notched or toothed inner periphery 41, forming in effect a circular recessed rack adapted to engage the outer extremities of spring-actuated rods 42 carried by the spokes 20. The inner extremity of each rod 42 is located about midway between the inner periphery of plate 19 and the hub 9, and is connected by means of a toggle joint with one extremity of a short bar 43, the opposite extremity of said bar being pivoted between two right angular projections 44, rigidly secured to or cast integral with each of the spokes.

Each rod 42 is provided with a spring 45 which may be located as shown in Fig. 3. In the last named figure a stop 46 is secured to the spokes and forms a seat for the inner extremity of the spring which is not secured to the rod. In this case the outer end of the spring is made fast to the rod whereby as the rod is drawn inward or toward the hub of the wheel, the spring is compressed. As shown in Fig. 3 the outer extremity of the spring is secured to the spoke or to a stationary block thereon while the inner extremity is made fast to the rod 42. By this construction as the rod is moved toward the center of the wheel the spring is stretched or distended. The outer extremity of each rod 42 is guided to engagement with the recess 47 of plate 19 by a block 48 secured to the spoke and provided with a groove 49 which is closed on one side by the spoke and hence when in place forms a closed guide way for the rod. Block 48 is also provided with an outer flange or projection 48$^a$ overlapping the inner periphery of plate 19, and maintaining said plate in position when the spring-actuated rods are withdrawn from engagement therewith.

When the machine is in gear bar 43 occupies the position shown in Fig. 4, its inner extremity being elevated so that the bar stands at an angle with projections 44; when bar 43 is in this position rods 42 are at their outward limit of movement engaging the toothed or cogged rack 41. When the parts are in this position it will be observed that plate 19 must rotate with the driving wheel, the machine being in gear or the motive power mechanism in operative relation or position.

It will be observed that by withdrawing rods 42 from engagement with the cogged rack 41, plate 19 need not rotate with the driving wheel and will not rotate therewith if the cam roller is in place and any considerable resistance offered. Hence to throw the machine out of gear it is only necessary to withdraw rods 42 from engagement with the surrounding cogged rack. This is accomplished by the laterally movable ring 40, supported by the rigid arms 51 made fast to the ring at their outer extremities, their inner extremities being pivoted at a suitable point to lever 52, which is pivoted below the axle at 53. There are preferably four of these arms, two on each side of the axle, one pair being pivoted directly to the lever as shown at 54, while the other two are suitably attached to a branch arm 55 of the lever at a point 56 directly opposite 54 and on the other side of the axle. Lever 52 is locked in any desired position by a dog 57 pivoted to the lever at one extremity. The other extremity of this dog engages the peripheral edge of a notched or toothed plate 58 which is secured to the axle in any suitable manner. The notched edge of this plate projects above the axle while the opposite edge extends below the same. Lever 52 is pivoted to the lower edge of this plate as shown in Figs. 17 and 18. The locking dog is actuated by a vertical rod 59 having its lower extremity pivoted to the dog and its upper extremity connected with the lever by a bell crank lever fulcrumed upon the upright lever as shown in Fig. 17. It must be observed that lever 52 is not secured directly to the axle but only to plate 58 below the same as shown at 53, the main arm and branch of the lever moving freely upon the axle at the points 54 and 56.

In Figs. 19 and 20 is illustrated a modified form of mechanism for supporting and actuating ring 40. This mechanism consists of an arm 159 pivoted upon a lever 60. This arm is divided into branches 59$^a$ which are rigidly secured to ring 40. Lever 60 is pivoted to a plate 61 below the pivotal point of arm 159. Plate 61 is securely bolted to the axle, its upper edge being notched for the reception of a locking dog 62 pivoted to the lever 60 and controlled by an upright rod 63 which may be connected and operated in the same manner as rod 59 heretofore described. It will thus be seen that by either of these forms of mechanism ring 40 may be forced to engagement with bars 43, and rods 42 simultaneously released from the inner peripheral edge of plate 19, or the ring may be moved in the opposite direction, releasing bars 43, when rods 42 are automatically returned to engagement with plate 19.

In the specification of the construction and operation of the motive power devices, it is seen that the arms 22 and 25 form a joint whose fixed shoulder is in the head of upright 23, its elbow at the union of 22 and 25, where through the medium of the cam roller, the power is applied, while the lower end 25 is the hand by which the power exerted to bend and straighten the arm composed of 22 and 25 is transmitted to the other parts. This arrangement secures the transmission of a very large, and it may be said, the largest possible percentage of power from the drive wheel to the cutting mechanism.

64 and 65 are the outer and inner shoes respectively, to be more particularly hereinafter described, to which is attached the finger bar 66 having fingers 67, above which plays, the sickle 50 which is pivotally connected to the pitman 39.

Shoe 64 is shown in detail on an enlarged scale in Figs. 21 and 22 in which the body of the shoe is shown enlarged at 68 forming a seat for the end of the finger bar. Upon the outer side and near the rear end is the wheel 69 for supporting the shoe, journaled on an arm 70 pivoted to the shoe at 71 so that as the free end of this arm carrying the wheel is raised or lowered, the shoe itself is raised or lowered. The rear end of this arm 70 is formed with a rack or ratchet at 72, in the spaces of which takes the pawl or dog 73 pivoted on the body of the shoe and held in engagement with the rack or ratchet wheel by a spring 74 acting thereon and locking the arm at the point necessary to gain the desired elevation of the shoe. The front of the shoe extends upwardly, tapering at its extreme front to the dividing point 75, in the rear of which is pivoted the main dividing and guiding arm 76, extending rearwardly and normally bent as shown in Figs. 21 and 22 to divide the grass or grain and throw that which is subject to the action of the sickle inwardly clear of the shoe, and into the path of the "cut." This arm 76 has a circular body through which it is pivoted to the shoe, and adjacent to such circular body is pivoted a locking cam 77 whereby the arm 76 may be locked in position at the desired angle or elevation. An auxiliary dividing and guiding arm 78 is pivoted at the rear end of the shoe to aid in more certainly throwing the cut grain or grass into the "cut" and out of the path of the drive wheel on its next round. This arm 78 has a circular body 79 at its pivotal end upon the periphery of which is formed the rack or ratchet 80, a lug or button 81 being pivoted to the body of the shoe, being adapted to take in the spaces of the rack or ratchet and lock said arm in position at any desired elevation or angle of inclination.

The inner shoe 65 is seen in Fig. 1 and in detail on an enlarged scale in Figs. 23 and 24, in which 82 is the wheel supporting the shoe and located at the front end thereof. The wheel is mounted on and toward the front of the segmental arm 83 pivoted at the rear end or point to the body of the shoe. The front end of this arm is formed into a rack or ratchet 84, in the spaces of which is adapted to take a lug or button 85 pivoted upon an arm 86 rigidly secured upon shoe 65. By these means the elevation of the shoe may be regulated and is locked in position at the desired height. At the rear end of the shoe an arm 87 rises therefrom to which are to be connected the devices for lifting or folding up the finger bar and sickle. Just within the arm 87 the finger bar 66 is secured to the shoe occupying a part of a recess or depression 88 there formed for the purpose, the remainder of which recess forms a seat or space for the sickle blade or its bar to reciprocate in. This shoe is pivoted to the limbs 89 of the fork of the forked connecting arm 90 (seen in Figs. 1 and 2). Arm 90 is pivoted to its upper end to a lug or projection 91 on the framing and is rotatably supported near the fork by a brace 92 extending thereto from the framing. It is thus mounted in order that it may be rocked or oscillated by proper means (to be hereinafter described) to vary the angle of the finger bar and sickle to the surface traveled over. At its forked end it is bent or inclined upwardly at a suitable angle to afford space beneath it for the pitman rod to pass and connect with the sickle and for them to reciprocate within the fork which passes over them. The pivotal connection of the fork to the shoe and of the pitman rod to the sickle should lie in the same transverse plane to permit the lifting and folding up of the sickle.

Means are provided for regulating and controlling the inclination of the finger bar and sickle, both to the body of the machine and to the surface the machine may be traveling over. For the former purpose an upwardly extending arm 87 (hereinbefore mentioned), is rigidly attached to the rear end of the inner shoe from the top of which a cord or chain 93 extends upward, inward, and over a small guide pulley or roller 94 mounted upon the frame, whence it passes to the forward extremity of a sliding horizontal ratchet bar 95 supported longitudinally by a bar 97 having its rear extremity supported by the axle and its forward extremity connected with a horizontal bar 96 extending from the tongue and at right angles thereto. The cord or chain 93 is secured to the forward extremity of the ratchet bar, which is moved back and forth upon its support by a lever 98 (see Fig. 10) pivoted upon bar 97 and to which is pivoted one extremity of a dog or pawl 99 adapted to engage the teeth of the bar, the pawl being controlled by an upright rod 100 pivoted to the pawl at its lower extremity and to a bell crank lever 101 at its upper extremity, the bell crank lever being fulcrumed upon lever 98. (See Fig. 11.) It will thus be seen that by the proper manipulation of lever 98 the ratchet bar may be drawn forward and the finger bar and sickle raised to any desired inclination to the surface over which the machine is moving. When properly adjusted the bar 95 is maintained in the desired position by a locking pawl or dog 102 pivoted to a suitable support 103 secured to the supporting bar 97. This locking pawl may be operated by the foot.

Another form of the mechanism for locking ratchet bar 95 is shown in Figs. 13 and 14 and consists of a frame 104 pivoted to a lug 105 secured to the rear side of the axle. Frame 104 extends upward from its pivot to the horizontal plane of the ratchet bar when it extends forward. This locking frame consists of two side arms connected at their forward extremities by a transverse arm adapted to engage the teeth of the bar, one of the side arms extending backward beyond the pivot or fulcrum and forming an arm 106 by means of which the device may be controlled by the foot as will be readily observed.

A modified form of mechanism for controlling the inclination of the finger bar and sickle, is illustrated in Figs. 15 and 16. In this case cord or chain 93 is connected to the periphery of a grooved pulley or roller 107, forming in effect a lever arm, and rigidly secured upon the front end of a shaft 108 journaled in suitable bearings upon the framing. Upon the rear end of such shaft a lever arm 109 is pivoted or fulcrumed, and just within the same a ratchet wheel 110 is rigidly attached. Upon the arm 109 is pivoted the pawl 111 adapted to engage the teeth of the ratchet wheel locking the lever thereto when the latter is moving in the direction necessary to wind up the chain or cord 93 upon pulley 107, but releasing the lever therefrom when it is moving in the opposite direction, a spring 111 serving to force and keep the pawl in proper operative position or connection. A rod, cord or chain connects the free or outer end of the pawl with the elbow lever pivoted at the handle end 109 and in such position that it may be grasped by the hand of the driver or operator. If now the lever be raised it will turn the ratchet and attached shaft, and through the medium of chain 93 and pulley 107 lift the guard bar and sickle over toward the framing of the machine where they may be held in the proper position. This mechanism enables the driver to easily and instantly raise the finger bar and sickle over any obstacle in their path and quickly lower them again. If it be desired to lock the parts in the elevated position a dog or locking pawl 112 pivoted upon the axle, is brought into use.

It is often desirable to vary the inclination of the finger bar and sickle to the material operated on and the surface traveled over. For instance, if the latter be gravelly and somewhat stony, if the fingers of the bar and the knives of the sickles be inclined upwardly, they may more easily slide over stones, &c., which they would otherwise strike and thereby possibly damage themselves, while if the surface be free from stones, &c., and comparatively smooth it may be desirable to incline the guards and blades downwardly in order to cut as close to the ground as possible for the greater length of hay or straw. To accomplish this an arm 113 projects upwardly from the forked arm 90, which as before stated, is pivotally supported in lug 91 on the framing and by a brace 92. From arm 113 a rod or bar 114 extends to the lower end of a lever 115 pivoted or fulcrumed in a lug or bearing 116 on the axle 11, to which lug or bearing is rigidly secured a segment of a circle 117 having its peripheral edge formed into a rack or ratchet. The rod or bar connecting arm 113 and lever 115 is pivotally or movably attached to each so that as motion is given to the upper end of lever 115 the forked arm will be rocked in the opposite direction, turning the front face or edge of the fingers and blades up or down, as the guard plate is secured to the inner shoe which is pivoted to the members 99 of the forked arm 90. An inverted T-shaped lever 118 (see Fig. 12) is pivoted on lever arm 115 near the handle end thereof, which lever is connected by a cord or rod 119 to a pawl 120 pivoted on lever 115 and in position to lock lever 115 to the segmental rack 117. This pawl is pivoted in a slot in lever 115 and the cord or chain 119 goes directly from the engaging end of 120 to the free end of 118, so that as the handle end of 118 is grasped and forced into and against the handle of 115, the pawl is lifted from engagement with the rack 117, permitting the movement of the lever, a spring 121 serving to hold the pawl in engagement with the rack when the lever has been moved to the desired position. The axle is bent as at 122 to serve several ends. Such bend permits the main driving wheel to be much larger than the other wheel 12 supporting the frame, eighteen inches diameter being ample for the latter in practice. This small size of the latter permits the sickle to be set farther back and nearer to the line of power than is permitted in machines of ordinary construction.

A harvesting machine combined as thus described and shown is an exceedingly powerful, effective and rapidly working one. The peculiar combination of the motive-power parts insures the application of great power to the cutting mechanism. The size of the main driving wheel permits the use of a large number of sections of cam-grooves upon its face, each section giving a cutting stroke to the knives in each direction, so great speed in the movement of the knives and consequent great rapidity are secured.

Having thus described my invention, what I claim is—

1. The combination with the main driving wheel of a movable circumferential cam plate attached to one face thereof, the inner periphery of the plate being recessed or toothed forming a circular rack, and spring actuated rods supported upon the wheel and engaging said rack whereby the plate is locked upon the wheel, and suitable means for withdrawing said rods from the locking position, substantially as described.

2. The combination with the main driving wheel of a movable circumferential plate attached to one face thereof and provided with a zigzag shaped grooved way forming in effect a series of cams, the inner periphery of the plate being recessed or toothed forming a circular rack, and spring actuated rods supported upon the spokes of the wheel and engaging the spaces in said rack whereby the plate is locked upon the wheel, and suitable means for withdrawing said rods from the locking position, substantially as described.

3. The combination with the main driving wheel of a movable circumferential plate attached to one face thereof and provided with a grooved way forming a series of cams, the inner peripheral edge of said plate being formed into a cogged or recessed rack, rods slidingly secured to the spokes of the wheel and normally adapted to engage the spaces in said rack whereby the plate is locked to the wheel and means for withdrawing said rods from the locking position, substantially as described.

4. The combination of the main driving wheel of a movable plate attached to one face thereof and adapted to transmit motion from the motor wheel to the sickle as said wheel rotates, the inner peripheral edge of said plate being formed into a rack, spring-actuated locking rods adapted to engage the spaces in the rack with their outer extremities, the inner extremities being connected to the wheel by a hinge joint, a laterally movable ring supported upon the framing and actuated by a lever and adapted to engage an arm of the joint for the purpose of withdrawing the locking rods, substantially as described.

In testimony whereof I affix my signature in presence of two witnesses.

FRANK H. ROGERS.

Witnesses:
WM. MCCONNELL,
G. J. ROLLANDET.